(12) United States Patent
Haltiner, Jr. et al.

(10) Patent No.: US 8,232,017 B2
(45) Date of Patent: Jul. 31, 2012

(54) FUEL CELL STACK INCLUDING NON-FUEL CELL CASSETTE

(75) Inventors: Karl J. Haltiner, Jr., Fairport, NY (US); Stefan M. Maczynski, Canandaigua, NY (US); Peter E. Hendler, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 69 days.

(21) Appl. No.: 12/788,946

(22) Filed: May 27, 2010

(65) Prior Publication Data

US 2010/0233564 A1    Sep. 16, 2010

Related U.S. Application Data

(63) Continuation-in-part of application No. 11/823,618, filed on Jun. 28, 2007, now abandoned.

(51) Int. Cl.
*H01M 8/04* (2006.01)
*H01M 2/00* (2006.01)
*H01M 2/06* (2006.01)

(52) U.S. Cl. .................................................. 429/442
(58) Field of Classification Search .................. None
See application file for complete search history.

(56) References Cited

U.S. PATENT DOCUMENTS

| | | | |
|---|---|---|---|
| 2004/0265667 A1 | 12/2004 | Kato et al. | |
| 2007/0054159 A1* | 3/2007 | Ryoichi et al. | 429/13 |
| 2009/0004531 A1 | 1/2009 | Haltiner, Jr. et al. | |
| 2009/0004532 A1 | 1/2009 | Haltiner, Jr. et al. | |
| 2011/0129754 A1* | 6/2011 | Haltiner et al. | 429/442 |

* cited by examiner

*Primary Examiner* — Melvin C Mayes
*Assistant Examiner* — Colin W Slifka
(74) *Attorney, Agent, or Firm* — Thomas N. Twomey

(57) ABSTRACT

A fuel cell stack is disclosed including a non-fuel cell cassette having temperature sensing elements disposed therein. The temperature sensing elements are disposed in one or more void spaces in the non-fuel cell cassette, which void spaces are connected to openings in the side of the non-fuel cell cassette for lead wires to communicate information from the temperature sensing elements to components outside of the fuel cell stack.

13 Claims, 5 Drawing Sheets

FUEL CELL STACK INCLUDING NON-FUEL CELL CASSETTE

CROSS-REFERENCES TO RELATED APPLICATIONS

This patent application is a continuation-in-part of U.S. patent application Ser. No. 11/823,618, filed Jun. 28, 2007, now abandoned, which is incorporated herein by reference in its entirety.

RELATIONSHIP TO GOVERNMENT CONTRACTS

This invention was made with Government support under DE-FC26-02NT41246 awarded by DOE. The Government has certain rights in this invention.

BACKGROUND OF THE INVENTION

In practical fuel cell systems, the output of a single fuel cell is typically less than one volt, so connecting multiple cells in series is required to achieve useful operating voltages. Typically, a plurality of fuel cell stages, each stage comprising a single fuel cell unit, are mechanically stacked up in a "stack" and are electrically connected in series electric flow from the anode of one cell to the cathode of an adjacent cell via intermediate stack elements known in the art as interconnects and separator plates.

A solid oxide fuel cell (SOFC) comprises a cathode layer, an electrolyte layer formed of a solid oxide bonded to the cathode layer, and an anode layer bonded to the electrolyte layer on a side opposite from the cathode layer. In use of the cell, air is passed over the surface of the cathode layer, and oxygen from the air migrates through the electrolyte layer and reacts in the anode with hydrogen being passed over the anode surface, forming water and thereby creating an electrical potential between the anode and the cathode of about 1 volt. Typically, each individual fuel cell is mounted, for handling, protection, and assembly into a stack, within a metal frame referred to in the art as a "picture frame", to form a "cell-picture frame assembly".

To facilitate formation of a prior art stack of fuel cell stages wherein the voltage formed is a function of the number of fuel cells in the stack, connected in series, a known intermediate process for forming an individual fuel cell stage joins together a cell-picture frame assembly with an anode interconnect and a metal separator plate to form an intermediate structure known in the art as a fuel cell cassette ("cassette"). The thin sheet metal separator plate is stamped and formed to provide, when joined to the mating cell frame and anode spacers, a flow space for the anode gas. Typically, the separator plate is formed of ferritic stainless steel for low cost. In forming the stack, the cell-picture frame assembly of each cassette is sealed to the perimeter of the metal separator plate of the adjacent cassette to form a cathode air flow space and to seal the feed and exhaust passages for air and hydrogen against cross-leaking or leaking to the outside of the stack.

In order to monitor operating conditions and/or control operating parameters of a fuel cell stack, it is desirable to be able to measure internal temperatures at one or more locations in the stack. However, placement of temperature measuring sensor such as thermocouples into the stack can cause a number of problems, such as disrupting gas flow through the gas flow spaces, electrically shorting adjacent cell repeating units, and/or providing a potential path for gas leaks.

Accordingly, it would be desirable to provide a way to effectively measure internal stack temperature at one or more locations in the fuel cell stack while mitigating the above-identified problems.

SUMMARY OF THE INVENTION

The present invention provides a fuel cell stack comprising repeating fuel cell cassette units, and further comprising a cassette unit that does not include a fuel cell. This non-fuel cell cassette unit comprises:
   (a) a planar electrically and thermally conductive housing having first and second opposing horizontal planar surfaces in electrical contact with adjacent fuel cell cassette units in the stack assembly;
   (b) at least one opening disposed on a vertical side surface disposed between said first and second opposing horizontal planar surfaces, this opening leading to a void space within the housing;
   (c) a temperature sensor disposed in the void space; and
   (d) a lead wire disposed connected to the temperature sensor in the void space and extending through the opening and away from the fuel cell stack assembly for connection to a temperature monitoring device.

The non-fuel cell cassette described herein provides accurate measurement of internal temperatures in a fuel cell stack without exposing the temperature sensors to fuel and/or tail gas in the stack and with reduced potential for leaks along temperature sensor lead pathways, while still providing electrical continuity between fuel cells in adjacent cassettes in the fuel cell stack. These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, the invention will be described with reference to specific embodiments, without limiting same. Where practical, reference numbers for like components are commonly used among multiple figures.

Figure 1:
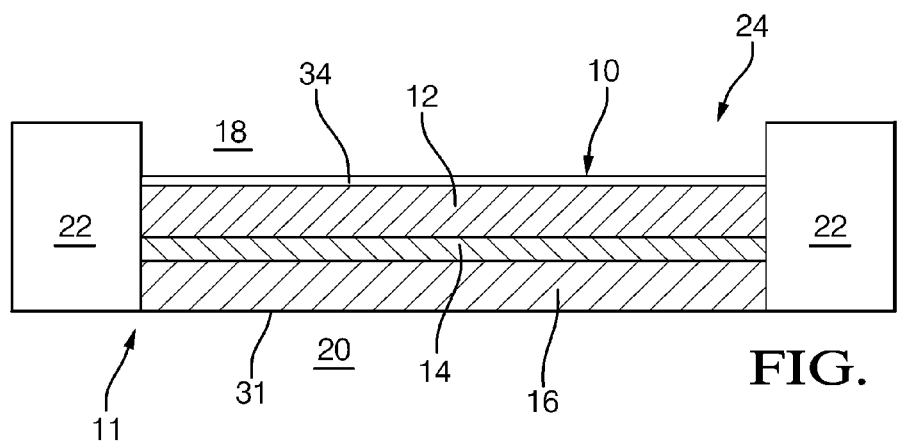
FIG. 1 is a schematic drawing of an SOFC mounted in a frame.
Figure 2:
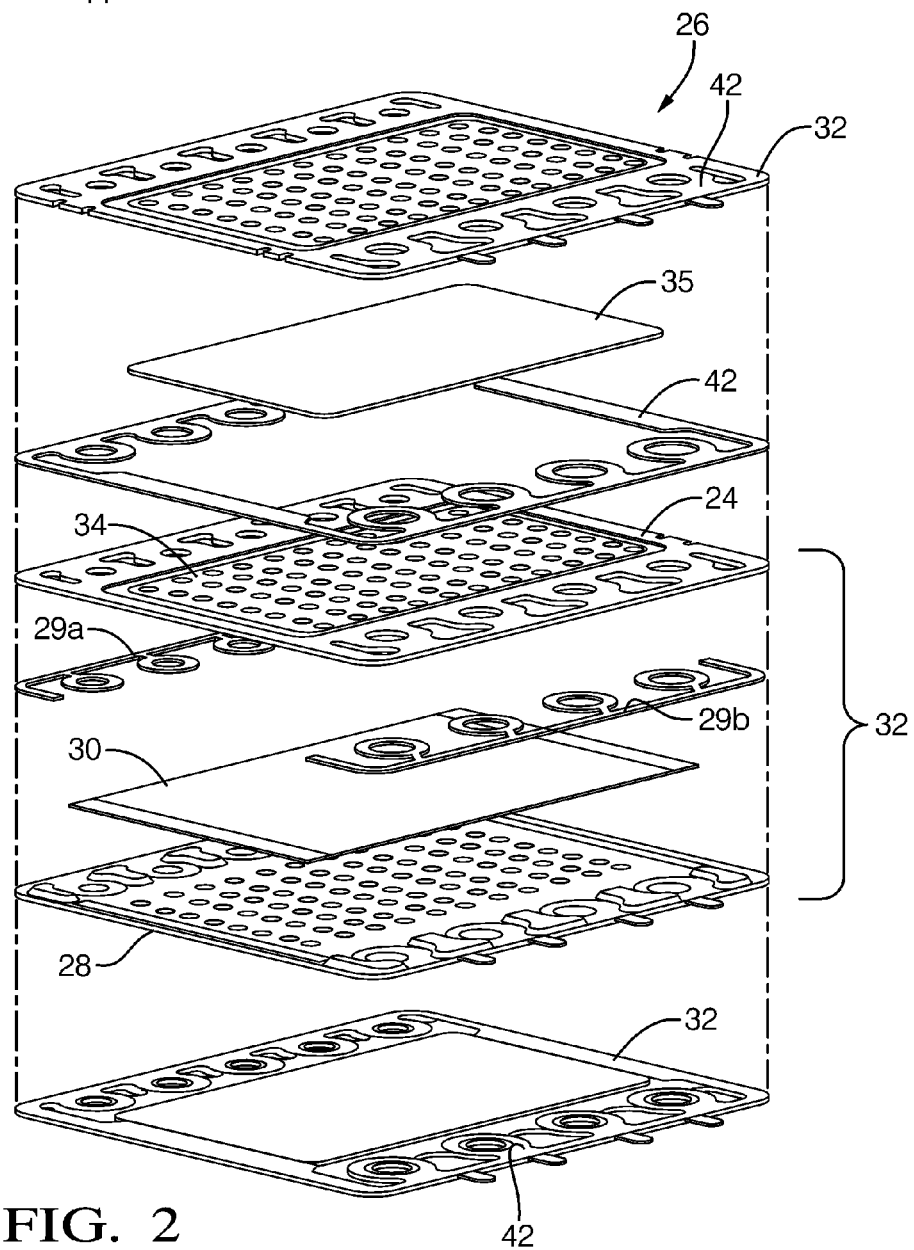
FIG. 2 is an exploded isometric drawing of a portion of a fuel cell stack employing a plurality of single-cell cassettes.
Figure 3:
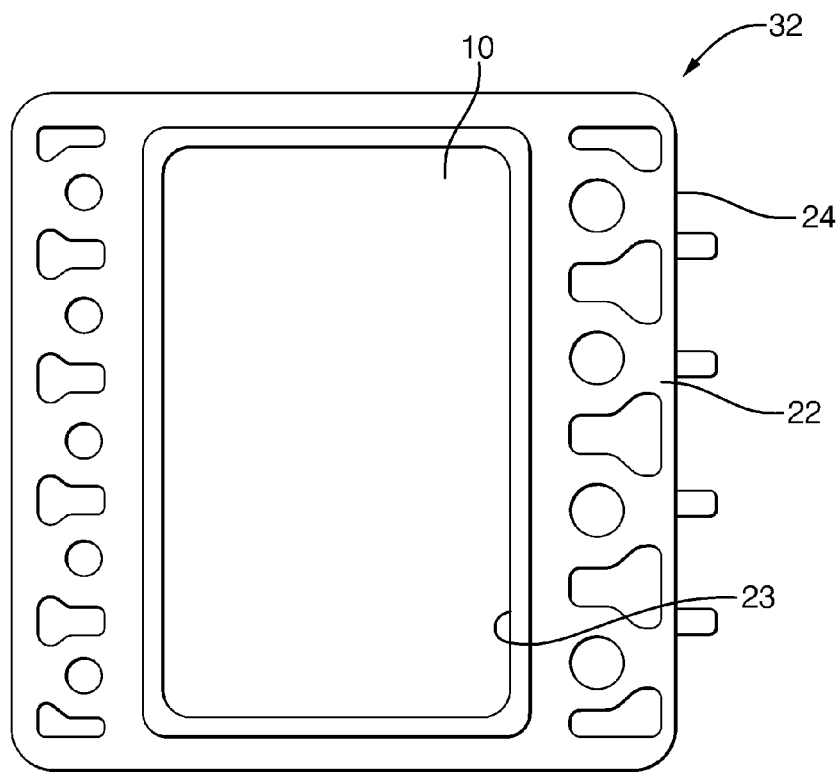
FIG. 3 is a plan view of a functional fuel cell cassette.

Referring to FIGS. 1 through 3, an exemplary functional SOFC fuel cell module 10 comprises an electrode 11 including cathode layer 12, an electrolyte layer 14 formed of a solid oxide and bonded to the cathode layer 12, and an anode layer 16 bonded to the electrolyte layer 14 on a side opposite from the cathode layer. Air 18 is passed over the surface 34 of the cathode layer 12, and oxygen from the air migrates through the electrolyte layer 14 and reacts in the anode layer 16 with hydrogen anode gas 20 being passed over the anode surface 31 to form water, thereby creating an electrical potential between the anode and the cathode of about 1 volt. Each individual fuel cell module 10 is mounted, for handling; protection, and assembly into a stack, within a metal frame 22 referred to in the art as a "picture frame", the frame having a central opening or "window" 23, to form a "cell-picture frame assembly" 24.

To facilitate formation of a stack 26 of individual fuel cells connected in series wherein the voltage formed is a function of the number of individual fuel cell modules in the stack, an intermediate process joins together each cell-picture frame assembly 24 with a separator plate 28 and a first solid (anode) interconnect 30 to form an intermediate structure known as a fuel cell cassette 32. The thin sheet metal separator plate 28 is stamped and formed to provide, when joined to the mating cell frame 22 and inlet and outlet anode spacers 29a, 29b, a flow space for the anode gas 20. Preferably, the separator plate 28 is formed of ferritic stainless steel for low cost. Anode interconnect 30 is placed between the separator plate 28 and the anode surface 31 of the cell within the cassette 32. The anode interconnect 30 is typically a woven wire mesh of uniform thickness and is solid in the direction perpendicular to the cell surface in a multitude of points.

A second solid (cathode) interconnect 35, installed during final assembly against cathode surface 34, provides a cathode air flow space. Interconnect 35 also is typically a woven wire mesh of uniform thickness and solid in the direction perpendicular to the cell surface in a multitude of points. During the final prior art stack assembly process, a glass perimeter seal 42 is disposed between adjacent of the cassettes 32, and the stack under pressure is brought to operating temperature and allowed to settle to its final form. The separator plate and cell frame may deform slightly, providing a compliant assembly, until the cells and interconnects are resting on one another, under load, which prevents further motion.

Figure 4:
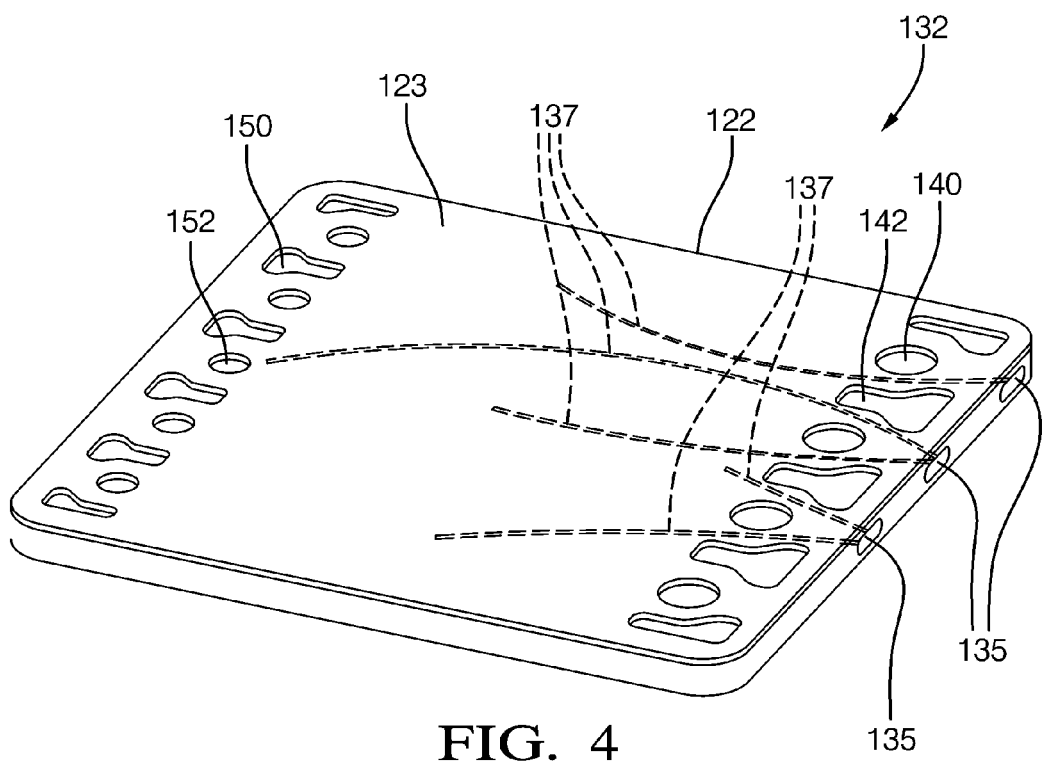
FIG. 4 is a plan view of a non-functional fuel cell cassette in accordance with the present invention.

Referring now to FIG. 4, a non-fuel cell cassette 132 in accordance with an exemplary embodiment of the invention comprises a substantially planar housing 122 having a first or lower surface (not seen in this view) and an upper or second surface 123. Openings 135 are disposed in a side surface disposed between the upper surface 123 and the lower surfaces. Channels or void spaces 137 connected to the openings 135 are disposed in the interior of the otherwise solid housing 122. The openings 135 connected to channels 137 may be formed by any known technique, such as by drilling or laser-cutting holes in the side member of the housing 22. Temperature sensors (not shown) are disposed inside of channels 137 with wire leads (not shown) running through the openings 135, from where they connect to conventional temperature sensing components such as a sending unit connected to an electronic control unit. Grommets or sealant may be used at the openings 135 to seal and retain the wire leads in place. In an exemplary embodiment where the non-fuel cell cassette is used as a cassette in a fuel cell stack as depicted in FIG. 2, the non-fuel cell cassette 132 will include air supply openings 140 for transmitting supply air between adjacent cassettes in the stack, fuel supply openings 142 for transmitting fuel between adjacent cassettes in the stack, exhaust air openings 150 for transmitting spent air collected from adjacent cassettes in the stack, and tail gas openings 152 for transmitting exhaust air collected from adjacent cassettes in the stack. In one exemplary embodiment, the channels 137 are connected in fluid communication with the exhaust air openings 150 (e.g., with a pilot hole or channel) in order to prevent heat-induced pressure buildup that could occur in the channels if they are completely sealed off and enclosed.

The housing 122 may be formed from any material such as steel that has suitable electrical conductivity so as to conduct electricity from adjacent fuel cells in cassettes on either side of the non-fuel cell cassette 132, and has suitable thermal conductivity so as to provide an accurate temperature reading from the temperature sensors in the channels 137.

Figure 5:
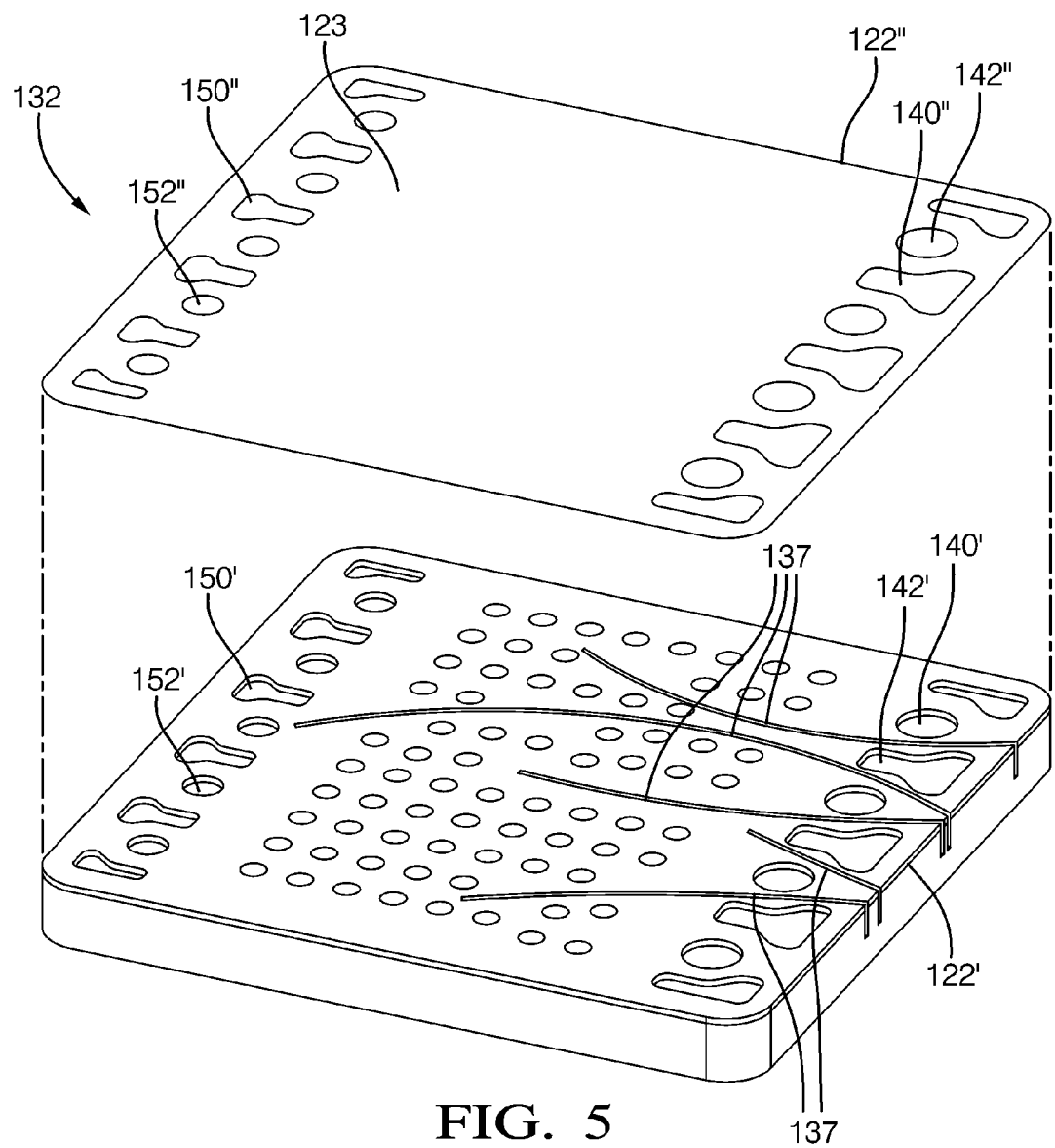
FIG. 5 is an exploded isometric view of the non-functional cassette shown in FIG. 4.

The embodiment shown in FIG. 4 may be formed from a solid piece of metal, but other embodiments may also be utilized with different fabrication techniques. For example, FIG. 5 depicts a two-piece exemplary embodiment of a non-fuel cell cassette 132 formed from lower housing plate 122' and upper housing plate 122". In this embodiment, channels 137 having a depth less than the thickness of lower housing plate 122' are cut into the upper surface of lower housing plate 122' using suitable tools such as a router or a laser or by chemical etching. Temperature sensors are disposed in the channels 137 with wire leads extending out of the channels 137 on the side of lower housing plate 122'. Any sort of known temperature sensor, such as a thermocouple, may be used. Spots of contact paste or brazing 136 are applied to the upper surface of the lower housing plate 122', and the upper housing plate 122" is adhered to the lower housing plate 122' and welded or brazed along the periphery to form a tight seal. The channels 137 can be disposed in fluid communication with the air exhaust openings 150 by leaving spaces between the spots of contact paste 136 to create a fluid flow path between the upper housing plate 122" and the lower housing plate 122', running between channels 137 and openings 150, and configuring the openings 140', 140", 142', 142", 152', and 152" to sealingly connect with one another while configuring the openings 150' and 150" to allow for fluid flow along the fluid flow path between the housing plates 122', 122".

Figure 6:
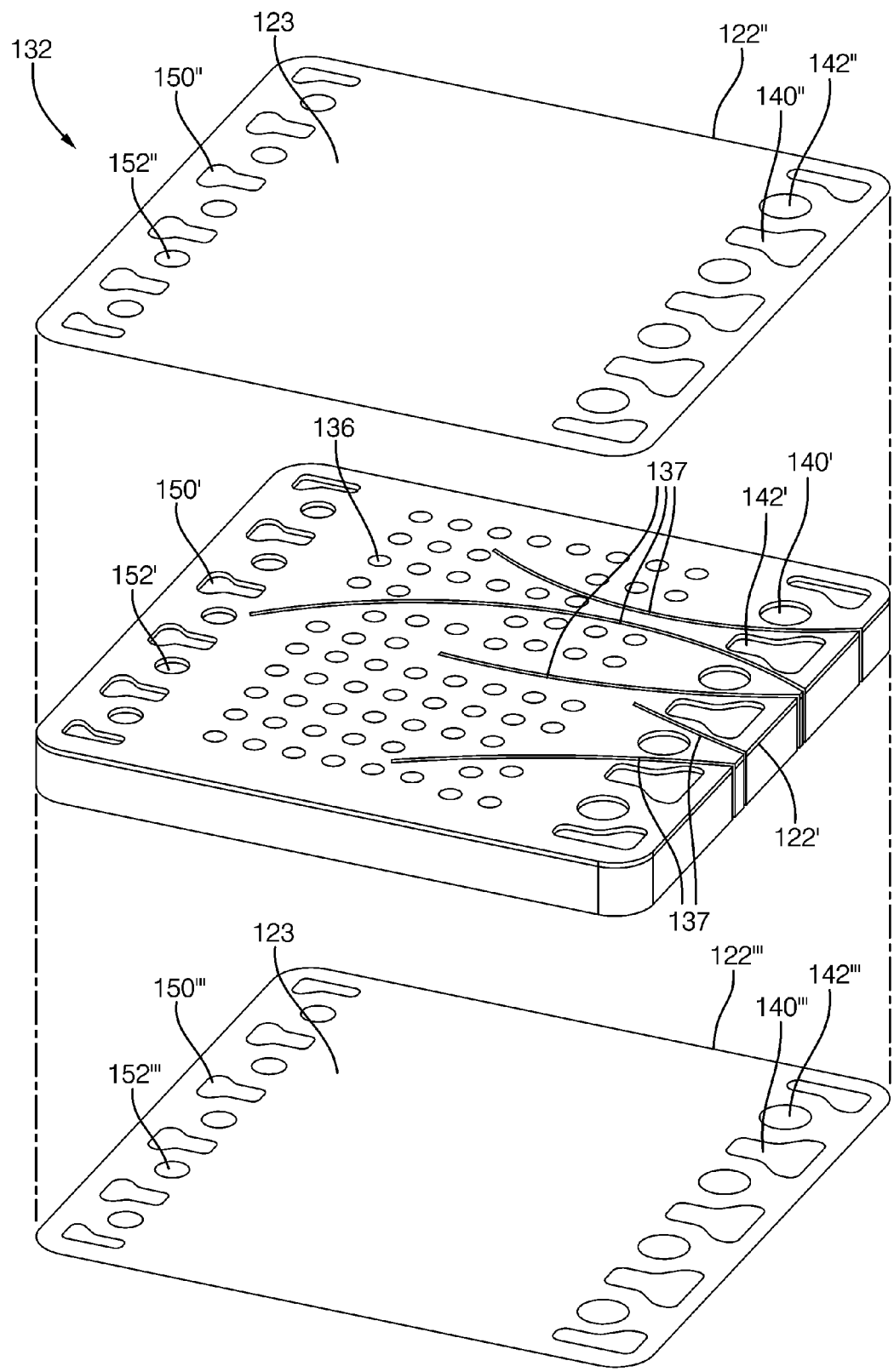
FIG. 6 is an exploded isometric view of a complete fuel cell stack employing a non-functional cassette.

In another exemplary embodiment, FIG. 6 depicts a three-piece embodiment of a non-fuel cell cassette 132 formed from middle housing plate 122', upper housing plate 122", and lower housing plate 122'''. In this embodiment, channels 137 are cut through the entire thickness of middle housing plate 122' using suitable tools such as a router or a laser or by chemical etching. Either upper housing plate 122" or lower housing plate 122''' are adhered to the middle housing plate 122', and temperature sensors are disposed in the channels 137 with wire leads extending out of the channels 137 on the side of middle housing plate 122'. Spots of contact paste or brazing 136 are applied to the other surface of the lower housing plate 122', and the other of the upper housing plate 122" or lower housing plate 122''' is adhered to the middle housing plate 122' and welded or brazed along the periphery to form a tight seal. The channels 137 can be disposed in fluid communication with the air exhaust openings 150 by leaving spaces between the spots of contact paste 136 to create a fluid flow path between either of the upper or lower housing plates 122", 122''' and the lower housing plate 122', running between channels 137 and openings 150, and configuring the openings 140', 140", 140''', 142', 142", 142''', 152', 152", and 152''' to sealingly connect with one another while configuring the openings 150', 150", and 150''' to allow for fluid flow along the fluid flow path between the middle housing plates 122' and the upper or lower housing plates 122", 122'''.

Figure 7:
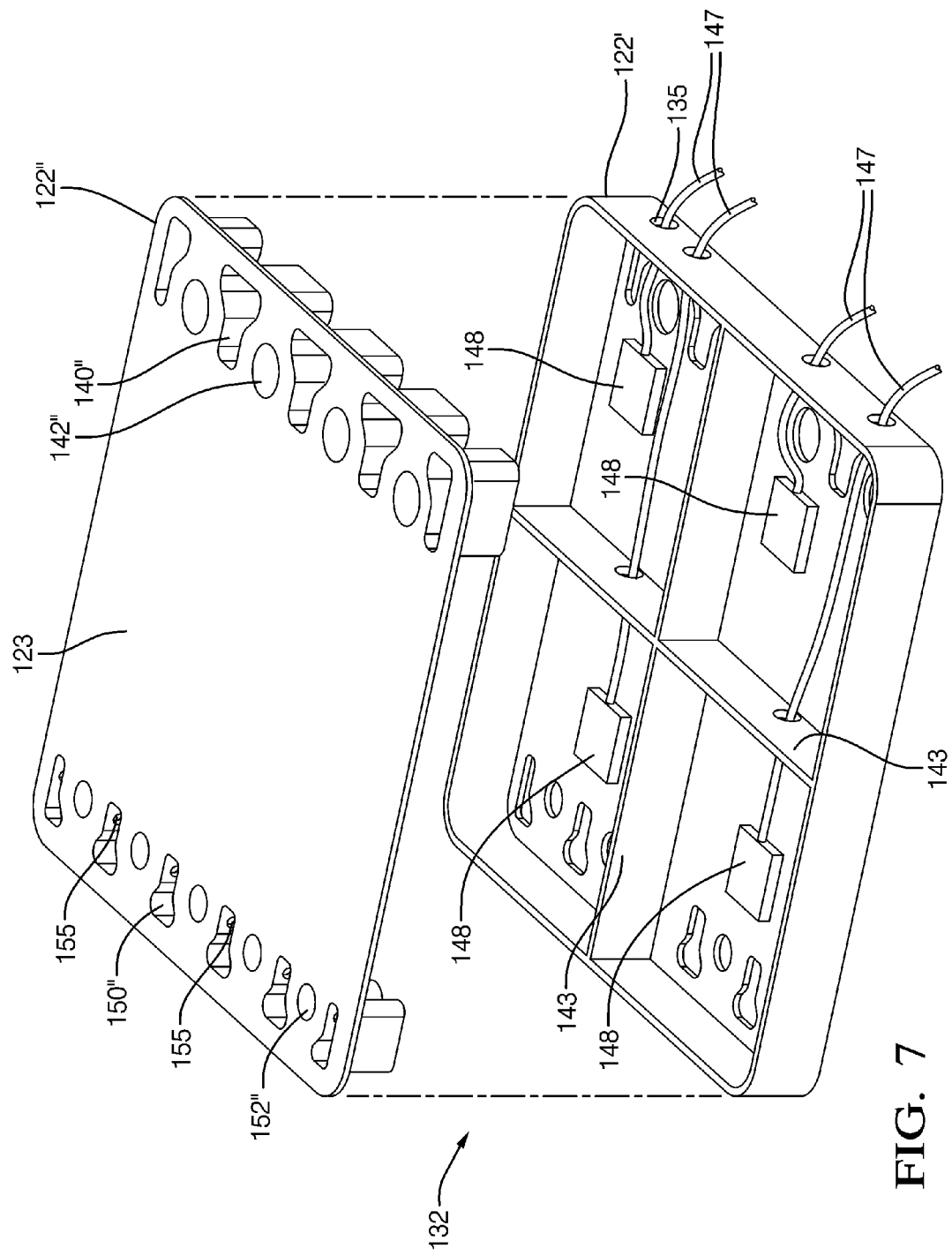
FIG. 7 is an exploded isometric view of a non-functional fuel cell cassette comprising a two-piece clamshell configuration in accordance with the present invention.

In yet another exemplary embodiment, FIG. 7 depicts a two-piece clamshell configuration of a non-fuel cell cassette 132 with lower clamshell component 122' and upper clamshell component 122". Internal stand-offs 43 provide bracing support to maintain the structural integrity of the clamshell structure. Upper clamshell component 122" can be a flat plate structure as shown in FIG. 7 or it can be a three-dimensional structure having depth and stand-offs like the lower clamshell component 122'. No channels are necessary, as the clamshell configuration provides ample internal void space for the disposition of temperature sensors 148. Wire leads 147 run from the temperature sensors 148 through openings 135. The clamshell components 122' and/or 122" will include air supply channels 140' for transmitting supply air between adjacent cassettes in the stack, fuel supply channels 142' for transmitting fuel between adjacent cassettes in the stack, exhaust air channels 150' for transmitting spent air collected from adjacent cassettes in the stack, and tail gas channels 152' for transmitting exhaust air collected from adjacent cassettes in the stack. Fluid communication for venting can be provided between the void space inside the clamshell structure and the exhaust air by the inclusion of a small hole or slit 155 in the side of the exhaust air channel 150'.

Any number of non-functional cassettes as described herein may be used in a stack at any of a number of locations in the stack, essentially any place where it is desired to measure temperature in the stack. Additionally, the non-functional cassettes may have any number of temperature sensors located at any of a number of locations along the plane of the non-functional cassette. Of course, the temperature sensor location profile of various non-functional cassettes in the fuel cell stack may be different from one another, depending on the temperature profile information that is desired at the particular level in the stack where the particular non-functional cassette is located.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A planar fuel cell stack assembly comprising repeating fuel cell cassette units, and further comprising a cassette unit that does not include a fuel cell, said non-fuel cell cassette unit comprising:
    (a) a planar electrically and thermally conductive housing having first and second opposing horizontal planar surfaces in electrical contact with adjacent fuel cell cassette units in the stack assembly;
    (b) at least one opening disposed on a vertical side surface disposed between said first and second opposing horizontal planar surfaces, said opening leading to a void space within said housing;
    (c) a temperature sensor disposed in said void space; and
    (d) a lead wire disposed connected to the temperature sensor in said void space and extending through said opening and away from the fuel cell stack assembly for connection to a temperature monitoring device.

2. A planar fuel cell stack assembly according to claim 1 wherein said non-fuel cell cassette includes at least one vertical air supply passage through the housing along a perimeter portion thereof for the flow of supply air between fuel cell cassettes in the fuel stack assembly adjacent to the non-fuel cell cassette, at least one vertical air exhaust passage through the housing along a perimeter portion thereof for the flow of exhaust air between fuel cell cassettes in the fuel stack assembly adjacent to the non-fuel cell cassette, at least one vertical fuel supply passage through the housing along a perimeter portion thereof for the flow of fuel between fuel cell cassettes in the fuel stack assembly adjacent to the non-fuel cell cassette, and at least one vertical tail gas exhaust passage through the housing along a perimeter portion thereof for the flow of tail gas exhaust between fuel cell cassettes in the fuel stack assembly adjacent to the non-fuel cell cassette.

3. A planar fuel cell stack assembly according to claim 2 wherein the vertical air exhaust passage is in fluid communication with the void space, and each of the vertical air supply, vertical fuel supply, and vertical tail gas exhaust passages are not in fluid communication with the void space.

4. A planar fuel cell stack assembly according to claim 1 wherein the non-fuel cell cassette comprises:
    (a) a first electrically and thermally conductive plate member having said first horizontal planar surface and a third opposing horizontal planar surface, said third planar surface including at least one horizontal channel disposed thereon, said channel having a depth less than the height of the first plate member and leading from a vertical side surface of the first plate member disposed between the first and third planar surfaces to a first location on the first plate surface away from said vertical side surface of the first plate;
    (b) said temperature sensor disposed in said channel at said first location on the first plate surface;
    (c) said lead wire disposed in said channel connected to the temperature sensor and extending along the channel to said vertical side surface of the first plate and away from the cassette; and
    (d) a second electrically and thermally conductive plate mounted on and in thermally and electrically conductive contact to the third plate surface of the first plate, and sealed to the first plate along at least a perimeter portion of the first and second plates.

5. A planar fuel cell stack assembly according to claim 4 wherein said non-fuel cell cassette includes at least one vertical air supply passage through said first, second, and third plates along a perimeter portion thereof for the flow of supply air between fuel cell cassettes in the fuel stack assembly adjacent to the non-fuel cell cassette, at least one vertical air exhaust passage through the first, second, and third plates along a perimeter portion thereof for the flow of exhaust air between fuel cell cassettes in the fuel stack assembly adjacent to the non-fuel cell cassette, at least one vertical fuel supply passage through the first, second, and third plates along a perimeter portion thereof for the flow of fuel between fuel cell cassettes in the fuel stack assembly adjacent to the non-fuel cell cassette, and at least one vertical tail gas exhaust passage through the first, second, and third plates along a perimeter portion thereof for the flow of tail gas exhaust between fuel cell cassettes in the fuel stack assembly adjacent to the non-fuel cell cassette.

6. A planar fuel cell stack assembly according to claim 5 wherein the vertical air exhaust passage is in fluid communication with the channel, and each of the vertical air supply, vertical fuel supply, and vertical tail gas exhaust passages are not in fluid communication with the channel.

7. A planar fuel cell stack assembly according to claim 1 wherein the non-fuel cell cassette comprises:
    (a) a first electrically and thermally conductive plate member having third and fourth opposing horizontal planar surfaces, said third planar surface including at least one gap or opening extending between said third and fourth planar surfaces and extending from a vertical side surface of the first plate member disposed between the third and fourth planar surfaces to a first location away from said vertical side surface of the first plate;

(b) said temperature sensor disposed in said gap or opening at said first location on the first plate member;

(c) said lead wire disposed in said gap or opening connected to the temperature sensor and extending through said gap or opening to said vertical side surface of the first plate and away from the cassette;

(d) a second electrically and thermally conductive plate mounted on and in thermally and electrically conductive contact to the third planar surface of the first plate, and sealed to the first plate along at least a perimeter portion of the first and second plates; and (e) a third electrically and thermally conductive plate mounted on and in electrically conductive contact to the fourth planar surface of the first plate member.

8. A planar fuel cell stack assembly according to claim 7 wherein said non-fuel cell cassette includes at least one vertical air supply passage through said first, second, and third plates along a perimeter portion thereof for the flow of supply air between fuel cell cassettes in the fuel stack assembly adjacent to the non-fuel cell cassette, at least one vertical air exhaust passage through the first, second, and third plates along a perimeter portion thereof for the flow of exhaust air between fuel cell cassettes in the fuel stack assembly adjacent to the non-fuel cell cassette, at least one vertical fuel supply passage through the first, second, and third plates along a perimeter portion thereof for the flow of fuel between fuel cell cassettes in the fuel stack assembly adjacent to the non-fuel cell cassette, and at least one vertical tail gas exhaust passage through the first, second, and third plates along a perimeter portion thereof for the flow of tail gas exhaust between fuel cell cassettes in the fuel stack assembly adjacent to the non-fuel cell cassette.

9. A planar fuel cell stack assembly according to claim 8 wherein the vertical air exhaust passage is in fluid communication with the void space, and each of the vertical air supply, vertical fuel supply, and vertical tail gas exhaust passages are not in fluid communication with the void space.

10. A planar fuel cell stack assembly according to claim 1 wherein the non-fuel cell cassette comprises first and second clamshell components joined along a perimeter joining portion to form an enclosure around said void space, said perimeter joining portion having said side opening therein.

11. A planar fuel cell stack assembly according to claim 10, further comprising at least one reinforcing member disposed in the void space for resisting collapse of the clamshell components into the void space.

12. A planar fuel cell stack assembly according to claim 10 wherein said non-fuel cell cassette includes at least one vertical air supply passage through said first and second clamshell components along said perimeter joining portion for the flow of supply air between fuel cell cassettes in the fuel stack assembly adjacent to the non-fuel cell cassette, at least one vertical air exhaust passage through said first and second clamshell components along said perimeter joining portion for the flow of exhaust air between fuel cell cassettes in the fuel stack assembly adjacent to the non-fuel cell cassette, at least one vertical fuel supply passage through said first and second clamshell components along said perimeter joining portion for the flow of fuel between fuel cell cassettes in the fuel stack assembly adjacent to the non-fuel cell cassette, and at least one vertical tail gas exhaust passage through said first and second clamshell components along said perimeter joining portion for the flow of tail gas exhaust between fuel cell cassettes in the fuel stack assembly adjacent to the non-fuel cell cassette.

13. A planar fuel cell stack assembly according to claim 12 wherein the vertical air exhaust passage is in fluid communication with the void space, and each of the vertical air supply, vertical fuel supply, and vertical tail gas exhaust passages are not in fluid communication with the void space.

* * * * *